United States Patent
Cousino

[11] 3,802,171
[45] Apr. 9, 1974

[54] IMPACT ACTUATED RECIPROCATING MOWER

[75] Inventor: Walter F. Cousino, Toledo, Ohio

[73] Assignee: Thermad, Inc., Toledo, Ohio

[22] Filed: Dec. 4, 1972

[21] Appl. No.: 312,115

[52] U.S. Cl. ................................. 56/13.4, 56/259
[51] Int. Cl. ..................................... A01d 87/10
[58] Field of Search .......................... 56/12.8–13.4, 56/13.6, 263, 259

[56] References Cited
UNITED STATES PATENTS

| | | | |
|---|---|---|---|
| 3,657,868 | 4/1972 | Cousino | 56/13.6 |
| 1,614,386 | 1/1927 | Peebles et al. | 56/13.4 |
| 1,844,750 | 2/1932 | Ellis | 56/13.1 |
| 2,026,291 | 12/1935 | Tirmacco | 56/13.3 |
| 3,430,421 | 3/1969 | Matthews | 56/12.9 |
| 1,597,367 | 8/1926 | McConnell | 56/263 X |
| 412,104 | 10/1889 | Letts | 56/261 |

Primary Examiner—Russell R. Kinsey
Attorney, Agent, or Firm—W. A. Schaich

[57] ABSTRACT

This invention relates to an improvement in a reciprocating mower of the type wherein two longitudinal rows of juxtaposed cutting teeth are relatively reciprocated by impact blows received from a rotary impactor. In accordance with this invention, the rotary impactor constitutes a relatively massive fly wheel and impact rollers are mounted on the outer periphery of the fly wheel member. Each of the rows of cutting teeth is connected to an actuator bar, and the two actuator bars are respectively disposed in spaced parallel relationship surrounding the periphery of the fly wheel and thus contacted by the impact rollers during each revolution of the internal gear. In accordance with another embodiment of the invention, the same motor driving means is utilized to propel a fan which is connected by a suitable housing to remove by air draft vegetation cut by the cutting teeth from such teeth and deposit same in a suitable receptacle.

1 Claim, 6 Drawing Figures

PATENTED APR 9 1974

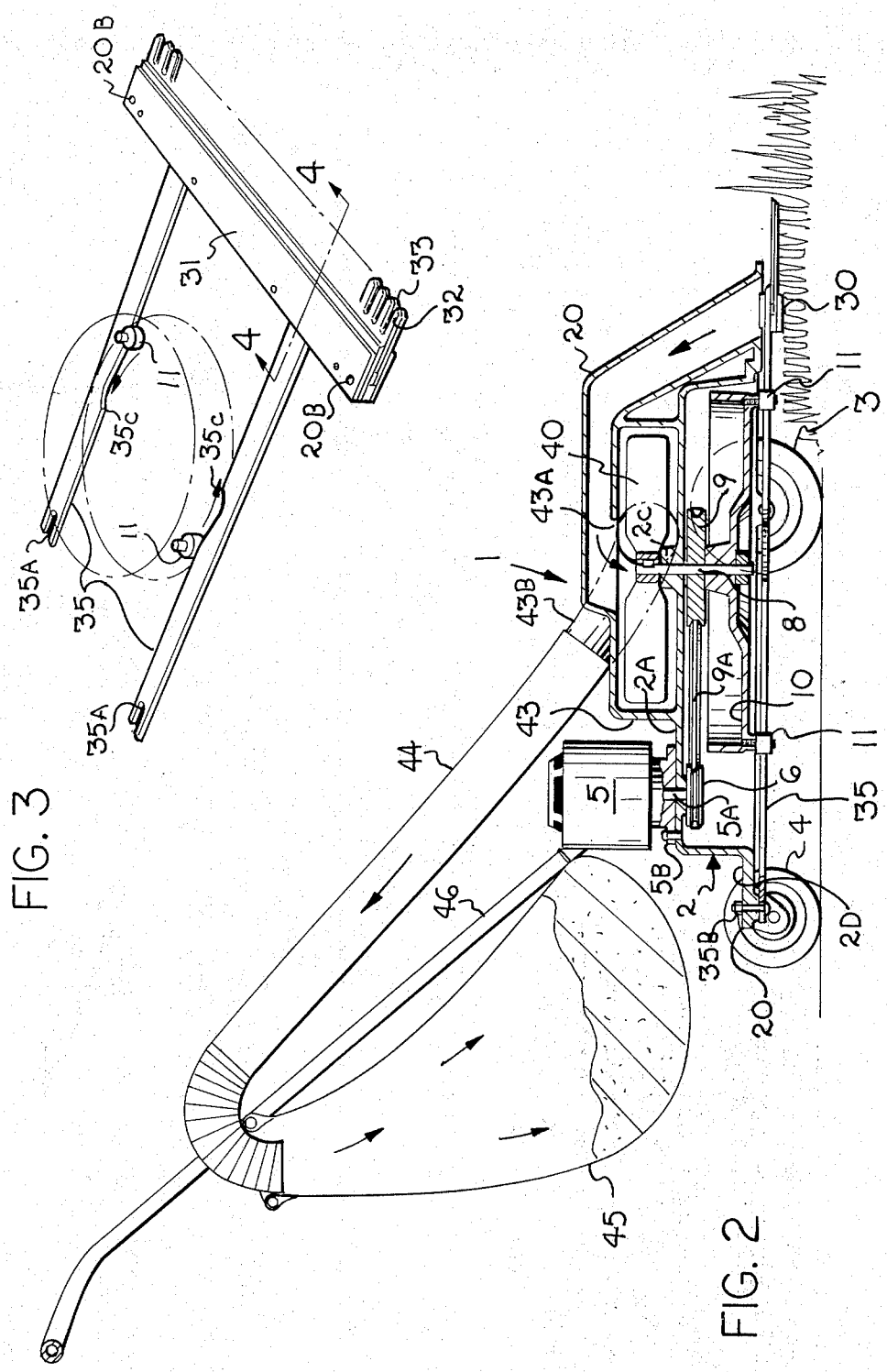

IMPACT ACTUATED RECIPROCATING MOWER

BACKGROUND OF THE INVENTION

This application constitutes an improvement on an impact actuated reciprocating mower of the type disclosed in my U.S. Pat. No. 3,657,868. While this prior patent discloses and claims an impact actuated reciprocating mower, experimentation has revealed that the construction shown in the patent suffers from two disadvantages. In the first place, the utilization of separate rotary actuating discs to impart impact blows respectively to the juxtaposed rows of cutting teeth resulted in the overall mower construction being heavier and more expensive than necessary. It is, of course, desirable that a rotary impact member have a substantial mass in order that the impact blow which it imparts to the cutting teeth does not materially reduce the speed of the rotary impactor. In accordance with this invention, a common rotary impactor is utilized to concurrently actuate both rows of cutting teeth, and this rotary impactor can be relatively massive so that it effects the desired impact actuation of the reciprocating blades.

The second disadvantage of my prior patent lay in the fact that the vegetation cut by the impact actuated reciprocating cutting teeth tended to lie on top of the teeth and hence, clog the cutting action. In accordance with this invention, a fan is provided which is driven by the motor means and suitable housings are provided around such fan so as to direct the inlet air stream to the fan across the rear portions of the cutting teeth so that cut vegetation is promptly removed from the cutting teeth by the air currents generated by the fan.

Accordingly, it is an object of this invention to provide an improved impact actuated reciprocating mower construction. A particular object of this invention is to provide an impact actuated mower construction wherein the impact driving mechanism is simplified and hence, made more economical.

A specific object of this invention is to provide a reciprocating mower construction wherein air currents induced by a fan driven by the same motor means as the reciprocating blades is employed to remove cut vegetation from the reciprocating mower teeth and thus prevent clogging of said teeth by the cut vegetation.

Further objects and advantages of this invention will be apparent from the following description and the annexed sheets of drawings on which:

FIG. 2 is a vertical sectional view taken on the plane 2—2 of FIG. 1.

FIG. 3 is a perspective view of the reciprocating blade assembly of the mower of FIG. 1.

AS SHOWN ON THE DRAWINGS

Figure 4:
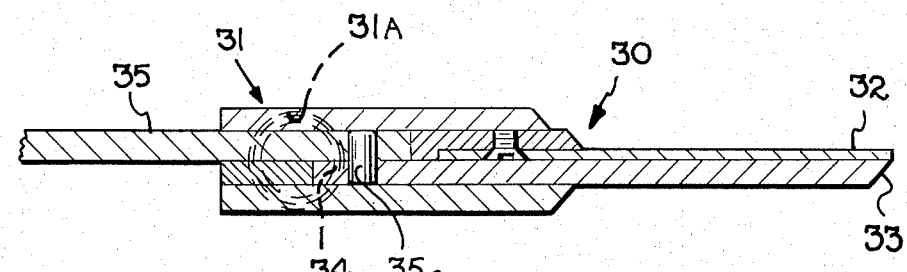
FIG. 4 is an enlarged scale sectional view taken on the plane 4—4 of FIG. 3.

A mower embodying the improvements of this invention is designated by the reference numeral 1. Mower 1 comprises an inverted, cup-shaped housing member 2 which provides structural support for all of the components of the mower. A pair of laterally-spaced, forward, ground-engaging wheels 3 are suitably journalled on the opposite sides of housing 2, and a rear ground-engaging wheel 4 is suitably journalled onto the rear extremity of such housing. While not shown, these wheels could be adjustably mounted relative to the housing 1 so as to vary the effective cutting height of the mower, but these details form no part of the instant invention.

On the top of housing 1 near the rear extremity thereof, a rotating power source 5 is mounted, here shown as an electric motor having a downwardly projecting shaft 5A. A bolting flange 5B provides means for mounting motor 5 to the top surface 2A of housing 2. A small pulley 6 (FIG. 2), is mounted on the shaft 5A immediately below the housing top surface 2A. A rotary flywheel impactor 10 in the form of a generally cup-shaped member is keyed to the lower end of a vertical shaft 8, which, in turn, is suitably journalled in a bushing 2C provided on housing 2. A large pulley 9 is keyed to shaft 8 and connected by belt 9A to pulley 6 to effect the driving of the fly wheel impactor 10 at a substantially reduced rotational rate relative to the speed of the motor shaft 5A.

At two diametrically spaced points on the bottom circumference of the flywheel impactor 10, a pair of impact rollers 11 are respectively mounted, and these rollers provide the actuating forces for the reciprocating cutter teeth of the mower.

Figure 5:
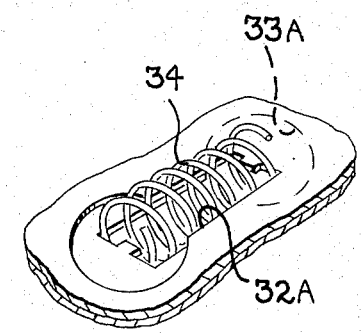
FIG. 5 is an enlarged scale partial perspective view of the spring mounted between the cooperating mower blades.
Figure 1:
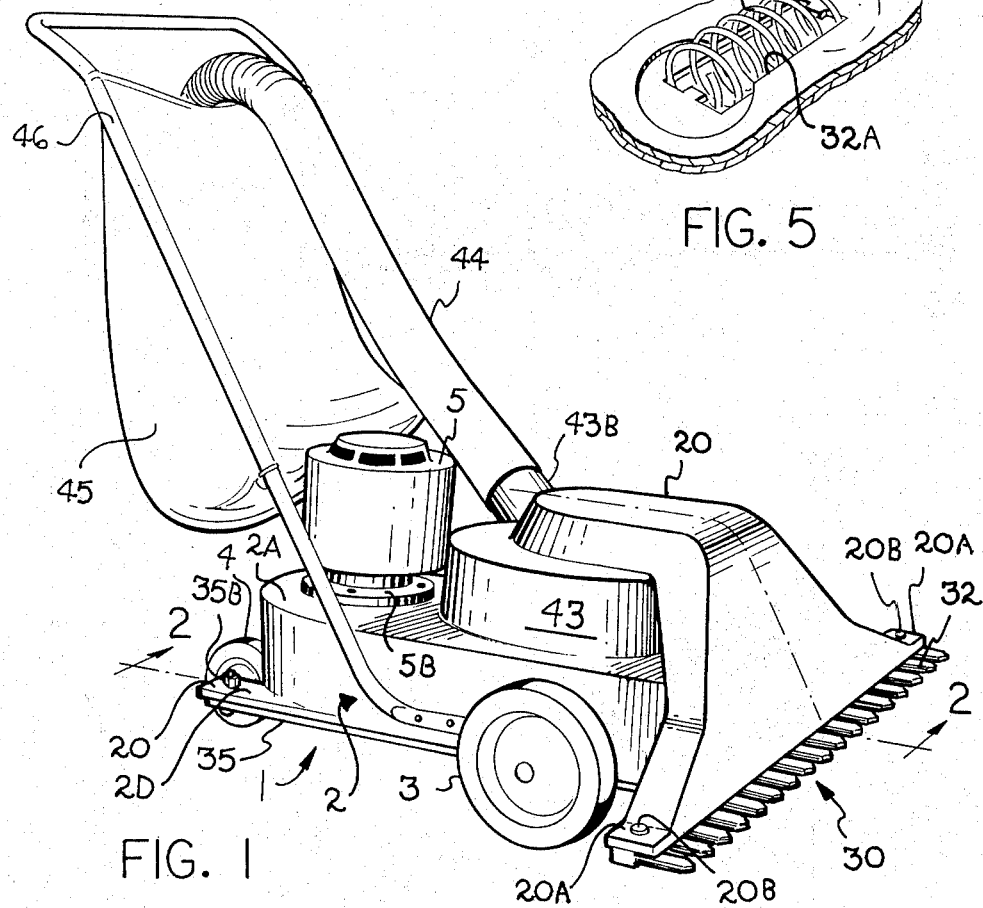
FIG. 1 is a perspective view of an impact actuated mower construction embodying this invention.

At the front end of the housing 2, a hollow fan inlet housing 20 is welded or otherwise rigidly secured to main housing 2. The lateral extremities of fan housing 20 terminate in mounting lugs 20A (FIG. 1), and these lugs accommodate suitable bolts 20B which mount a reciprocating blade assembly 30 onto the mower. As best shown in FIGS. 3, 4, and 5, the reciprocating blade assembly 30 comprises a fixed channel-shaped structure 31, which is engaged by the mounting bolts 20B and within such channel-shaped structure, a pair of reciprocating cutting blades 32 and 33 are slidably mounted for limited reciprocal movement. A compression spring 34 is mounted in suitable slots 32A and 33A in the solid portion of the cutting blades 32 and 33 and in recesses 31A in channel structure 31. Spring 34 normally biases the teeth 32B and 33B of the cutting blades 32 and 33 to an aligned open position. Each cutting blade 32 and 33 is respectively pivotally connected to rearwardly projecting actuating bars 35 by pins 35C. Each bar 35 terminates in a slot 35A, which permits the pivotal mounting of such bars on shoulder bolts 35B which are respectively secured in depending relationship to horizontal ears 2D provided at each rear corner of the main housing 2. The actuating bars 35 thus pass closely adjacent to opposite sides of the impact flywheel actuator 10. An internally projecting obstruction 35C (FIG. 3) is provided on each actuating arm 35 and disposed to be impacted by the impact rollers 11 during each revolution of the actuator flywheel 10. In this manner, the cutting blades 32 and 33 are relatively reciprocated twice during each rotation of the impact flywheel 10 but nevertheless, remain in their open aligned position for a majority of the time, thus permitting grass or other vegetation to freely enter into the space between the cutting teeth so as to be impacted and cut by their relative reciprocal motion.

It is therefore apparent that the employment of a single rotary flywheel actuator 10 achieves the impact actuation of the cutting blades 32 and 33 without any substantial reduction in speed of the impact flywheel actuator 10 due to the relatively large mass of actuator 10.

A centrifugal fan 40 is mounted on the top portion of the vertical shaft 8. A generally circular fan housing 43 surrounds fan 40 and has an axial inlet 43A on its top surface which communicates with the air passage defined by the fan inlet casing 20. On its periphery, the fan housing 43 is provided with a tubular discharge housing 43B which connects with a suitable flexible hose 44 which, in turn, connects with a refuse-collecting bag 45 suitably suspended between the mower handles 46. Fan 40 is, of course, driven concurrently with the flywheel impactor 10. The fan 40 thus generates a substantial flow of air into the inlet housing 20, which results in picking up all vegetation cut by the reciprocating cutting blades 32 and 33 and transferring same to the bag receptacle 45. Thus the possibility of clogging the reciprocating cutting blades 32 by the cut vegetation is substantially eliminated.

Figure 6:
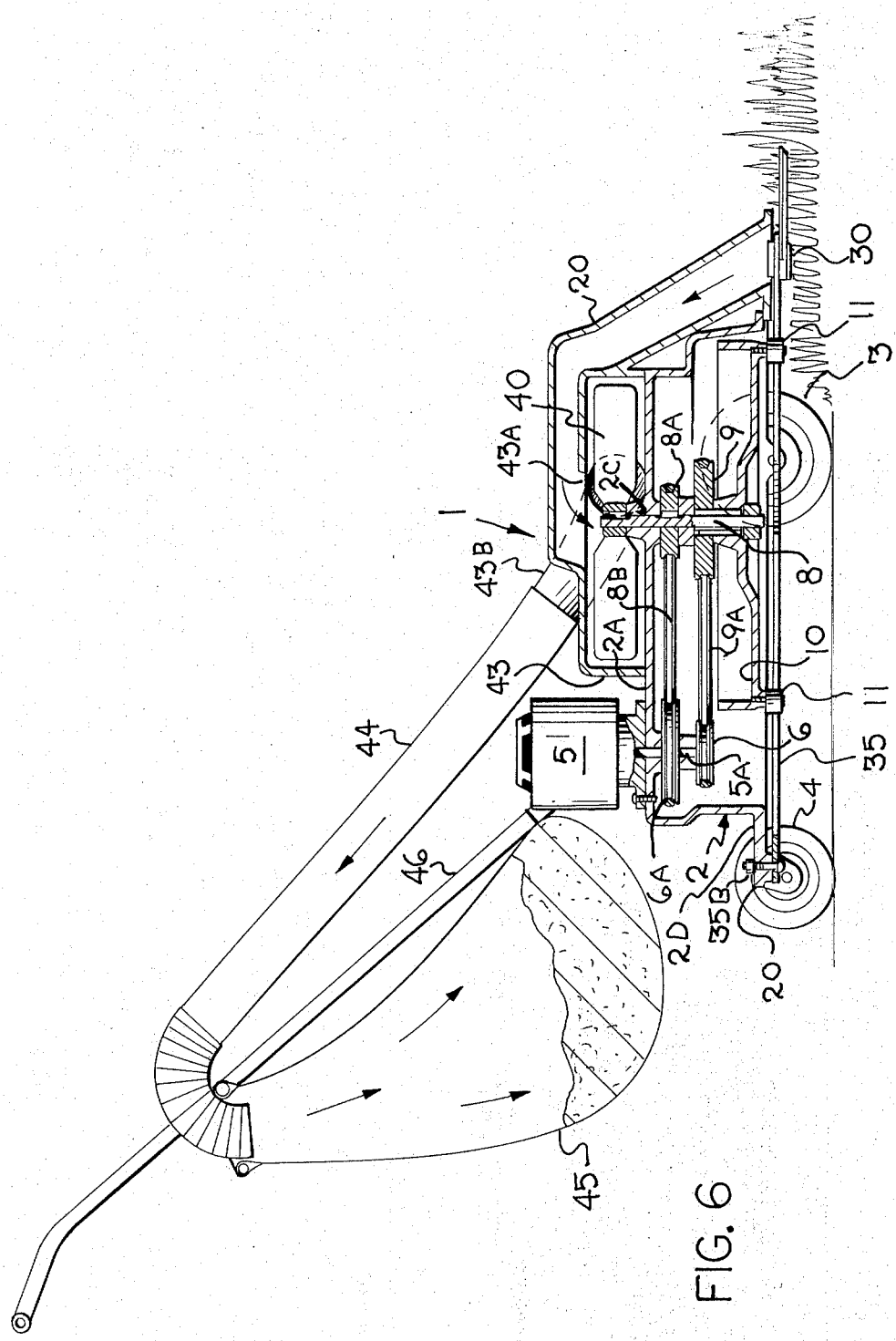
FIG. 6 is a view similar to FIG. 2 but in enlarged scale and illustrating a modified drive arrangement.

In some instances, it may be desirable to have the fan 40 rotate at a substantially higher speed than the impact flywheel 10. In such case, the drive modification of FIG. 6 may be employed. The motor shaft 5A is extended to mount not only a small pulley 6 but also a larger pulley 6A. Pulley 9 is keyed to flywheel impactor 10 and is driven by belt 9A rotating about shaft 8. A small pulley 8A is keyed to shaft 8, as is fan 40, and pulley 8A is driven by belt 8B. Hence, fan 40 rotates much faster than the flywheel impactor 10.

As will be evident to those skilled in the art, modifications of this invention can be made in the light of the foregoing disclosure without departing from the scope of the appended claims.

I claim:

1. A reciprocating mower comprising two rows of horizontal cutting teeth disposed in juxtaposition and relatively movable through a cutting stroke, resilient means operating between said two rows of cutting teeth to normally hold said teeth in an aligned open position, a pair of horizontally spaced parallel actuator bars respectively connected to the end portions of said cutting teeth rows, a fly-wheel rotatably mounted on a vertical shaft disposed between said actuator bars, a pair of diametrically opposed impact roller means mounted on the periphery of said flywheel and adapted to respectively impact said actuator bars during each revolution of said flywheel to momentarily shift said cutting teeth rows to their closed position, a fan mounted on said shaft and co-rotatable with said flywheel, thereby increasing the inertia mass of said impact roller means, and housing means for said fan for removing cut vegetation from said cutting teeth by air currents generated by said fan.

* * * * *